Dec. 4, 1928.
J. C. MERWIN
1,694,275
SPROCKET CHAIN
Filed March 19, 1925
2 Sheets-Sheet 1
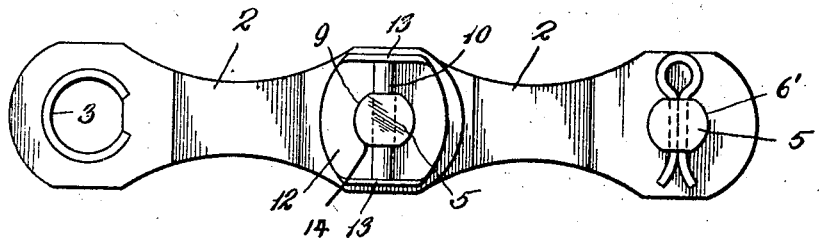
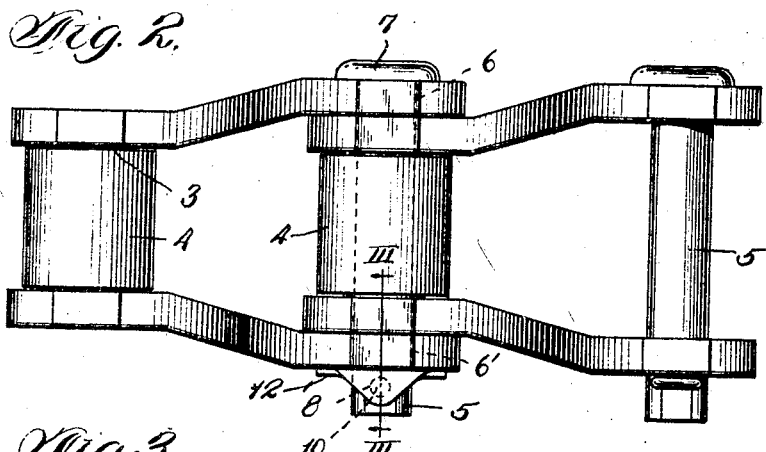
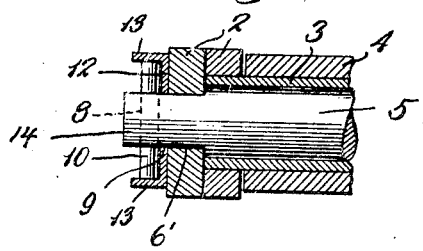 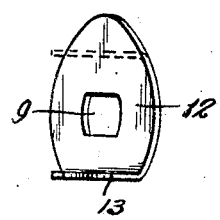
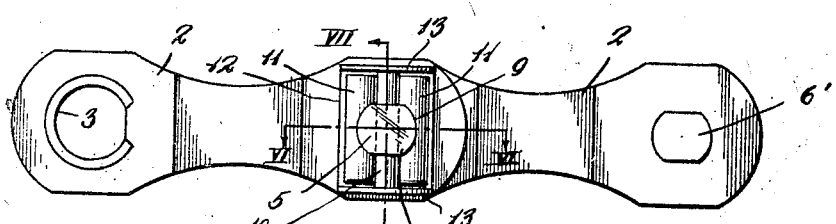
Inventor
John Clifford Merwin
By John S. Barker
Attorney Dec. 4, 1928.
J. C. MERWIN
1,694,275
SPROCKET CHAIN
Filed March 19, 1925   2 Sheets-Sheet 2
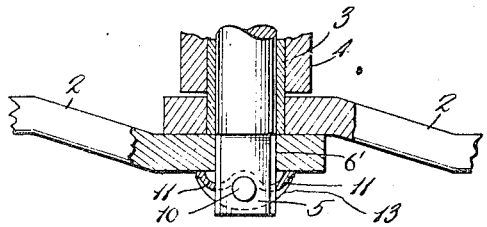
Fig. 6.
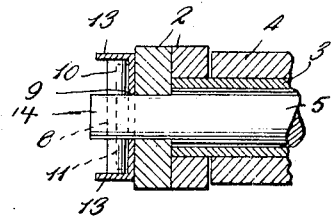
Fig. 7.
Fig. 8.
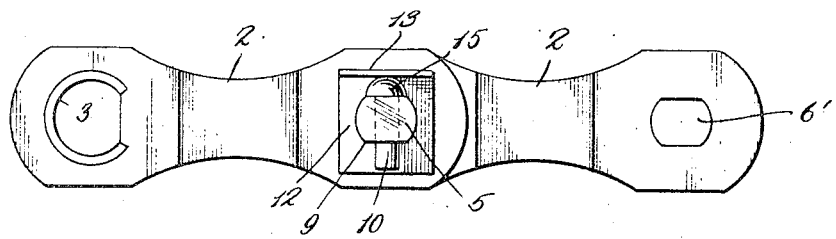
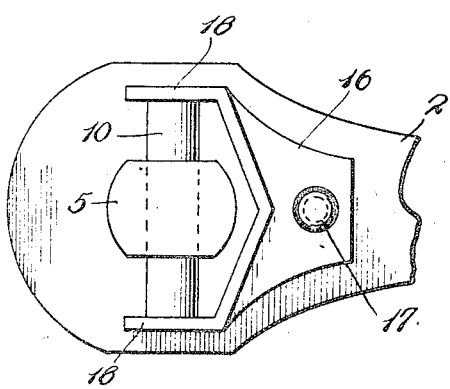
Fig. 9.
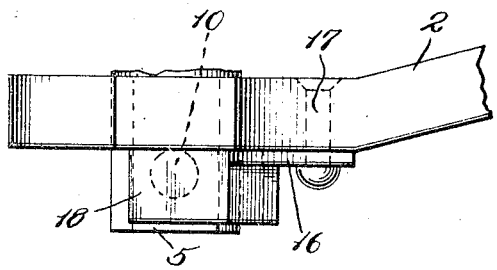
Fig. 10.
Inventor
John Clifford Merwin
By John S. Barker
Attorney Patented Dec. 4, 1928.

1,694,275

UNITED STATES PATENT OFFICE.

JOHN CLIFFORD MERWIN, OF MILWAUKEE, WISCONSIN, ASSIGNOR TO CHAIN BELT COMPANY, OF MILWAUKEE, WISCONSIN, A CORPORATION OF WISCONSIN.

SPROCKET CHAIN.

Application filed March 19, 1925. Serial No. 16,736.

My invention relates to sprocket chains, particularly to chains of that character which are intended for heavy duty, are constructed of steel, have separate side bars, and in which the links are united one to the other by pintles. The invention consists of means for securely holding in place under working conditions the separable connecting pintles.

In the accompanying drawings—

Figure 1 is a side view of a section of a sprocket chain to which one form of my invention is applied.

Fig. 2 is a plan view of the section of chain shown in Fig. 1.

Fig. 3 is a transverse sectional view taken on the line III—III of Fig. 1.

Fig. 4 is a detached perspective view of one of the locking washers shown in Fig. 1 as manufactured for use in connection with a chain such as shown.

Fig. 5 is a side elevation of a section of chain illustrating another form of my invention.

Fig. 6 is a horizontal sectional view taken on the line VI—VI of Fig. 4.

Fig. 7 is a vertical sectional view taken on the line VII—VII of Fig. 4.

Fig. 8 is a side view of a third form of my invention.

Fig. 9 is a side elevation illustrating a fourth form of my invention.

Fig. 10 is a plan view of parts shown in Fig. 9.

In the manufacture of heavy duty steel chain such as represented in the drawings it is generally recognized that the best results, so far as service is concerned, are obtained when the connecting pintles are riveted or headed at both ends, as such pintles cannot slip in their seats, and they operate to maintain the side bars in position, preventing them from spreading, throughout the entire life of the chain. However, there are so many disadvantages incident to the use of the riveted pintles, such as the difficulties encountered when it becomes necessary to replace a broken link, or make other repairs to the chain, that many users insist upon chains with easily separable pintles; and it is common practice to hold the separable pintles in place by the use of cotter pins. These, however, are not entirely satisfactory because they wear, become loose or broken, and frequently fall out, due to the heavy service to which they are subjected in the use of the chain. Further, the cotter pins do not give sufficient support to the side bars of the chain to hold them in position, such as is found in the riveted type of chain, and it frequently happens that before a cotter pin wears sufficiently to fall out of its seat it fails to hold the side bars, permitting them to spread, thus lessening the rigidity of the chain. It is to secure in one structure the advantages incident to both the riveted chain and to the pin-held separable pintle chain that my invention has been made.

In the accompanying drawings 2 are the separable side bars of the links of a sprocket chain. Each pair of opposite side bars are connected, at one end of the link, by a tubular cross bar, usually formed separate from the side bars but united therewith so that the two side bars and connecting tubular end bar operate as a unitary link structure. The particular form of the side bars, and the method of uniting them to the cross bars have nothing to do with the present invention, the chains illustrated in the drawings being of well known construction. It is usual to support upon each cross bar 3 an anti-friction roller 4. The links of the chain are united with each other by pintles 5, which pass through openings 6, 6' in the ends of the side bars and longitudinally through the hollow connecting bars 3. The pintles are connected with the side bars so as to turn therewith, as by forming a portion, 14, of the pintle near one end of angular shape to fit a corresponding opening, 6', in the side bar, this arrangement insuring that the wear incident to the flexing of the chain in operation shall be between the pintles and the hollow connecting bars of the links and not between the pintles and the side bars. This, however, is a common feature of construction in chains of the type to which my invention is applied. The pintles 5 are represented as being formed each with a head 7 at one end and with a diametric perforation 8 near the opposite end. Into each perforation there is inserted, as the chain is constructed, a pin 10, of a length a little greater than the diameter of the pintle. The pins 10 preferably fit the apertures 8 closely so that they have to be forcibly driven into them, and when properly seated are not liable to slip out.

To insure their being maintained in place, however, during the use of the chain I employ locking washers 12, which are perforated at 9, so they may be slipped over the pintles and lie close against the outer face of the side bars, between these and the pins 10. The washers when in position have their opposite edge portions turned up to form flanges 13, 13, that set opposite and close to the ends of the pins 10. In manufacturing the washers 12 one of the flanges 13 will be formed during the process of manufacture, as represented in Fig. 3.

The method of assembling the chain is as follows: A pair of links are united by passing the pintle 5 through the registering openings of the side bars and cross bar until arrested by the head of the pintle coming into engagement with the outer face of a side bar 2. The washer 12 is then slipped onto the end of the pintle opposite the head, the opening 9 through the washer being shaped to fit the angular part of the pintle. A pin 10 is then driven into the opening 8 through the pintle, until arrested by the engagement of its end with the flange 13 with which the washer was initially formed. Then the peripheral portion of the washer opposite to the flange 13 is turned up, by a hammer in the hand of a workman or by machinery provided for that purpose, thus confining the pin between the two flanges 13, where it is securely held so long as the chain is in use or until the flanges 13 are intentionally bent over and the washer flattened out, as is done when it may be necessary or desirable to remove the pin.

The width of the washer 12, taken on a diametric line passing through the portions which when turned up constitute the flanges 13, is preferably greater than the width of the side bar against which the washer lies when in use, with the result that when the washer is flattened out the portions thereof that constitute the flanges extend beyond, both above and below, the opposite edges of the side bar. This makes it easy for a workman to reach with a hammer the portions of the washer to be bent, whenever it may be necessary to turn up or straighten out the flanges 13.

The washer 12 cooperates with the pin 10 to hold the side bars of the link in position, preventing them from spreading apart, making a holding pintle connection that is equally efficient to a riveted pintle, while at the same time permitting the pintle to be easily removed. The pin 10 is very much stronger than is a cotter pin that could be used in the same perforation 8 as that in which the pin rests.

In Figs. 5, 6 and 7 I illustrate a form of washer that has some advantages over the flat washer that has already been described. As represented in said views, that part of the washer that lies between the flanges 13 and on either side of the pin 10 is shaped to form ridges 11 that are parallel with the pin 10. These ridges form a seat or channel in which the pin lies, and they also add an element of elasticity to the washer, so that it serves as a spring washer interposed between the pin and the adjacent outer face of the side bar of the link.

In Fig. 8 I have illustrated a form of invention in which the pin 10 is formed at one end with a head 15. When a pin of this form is used the washer need be formed with but one flange 13, which is arranged to be upturned so as to lie opposite the headed end of the pin when properly seated in the pintle.

The washers which have been described serve not only as keepers to retain the pins 10 properly seated in the pintles 5 but also give lateral support to the side bars of the chain, preventing them moving outward upon the pintles; and since the washers serve this double purpose I consider them the preferred form of keeper for the pins 10. However, my invention is not limited to a keeper of washer form, and in Figs. 9 and 10 of the drawings I have illustrated this fact. As there represented, the keeper for the pin 10 consists of a plate 16 adapted to be riveted or otherwise secured to a side bar of the chain near one end as represented at 17. This plate is provided with outstanding flanges 18 adapted to lie opposite to the ends of the pin and thus hold it in place when the plate is secured to the side bar.

The arrangement just described is entirely feasible and satisfactory so far as it serves as a keeper for the pin 10, but it does not give the lateral support to the side bars which is furnished by the washer form of my invention, and for that reason is not as desirable as the latter. In both forms of the invention the keeper is attached to the chain—by the pintle 5 and pin 10 in one construction, and by the rivet or bolt 17 in the other—so that it is supported and held with its flanges or projecting pin-retaining portions in proper position to perform their functions.

What I claim is:

The combination with a pair of sprocket chain links and a pin uniting them of a cross bar extending through the pintle, the opposite ends of the pin extending beyond the circumference of the pintle, and a washer interposed between the pin and the adjacent face of a side bar, the washer being of thin metal and formed with ribs parallel with the pin and with edge portions bendable and adapted to be bent outward to form flanges that lie opposite the ends of the pin.

JOHN CLIFFORD MERWIN.